(12) United States Patent
Wilson et al.

(10) Patent No.: US 9,963,991 B2
(45) Date of Patent: May 8, 2018

(54) BRUSH SEAL PLATE

(71) Applicant: United Technologies Corporation, Hartford, CT (US)

(72) Inventors: Ross Wilson, South Glastonbury, CT (US); Michael G. McCaffrey, Windsor, CT (US); John R. Farris, Bolton, CT (US); Theodore W. Hall, Berlin, CT (US); John W. Korzendorfer, Glastonbury, CT (US); Elizabeth F. Vinson, Wethersfield, CT (US); Jeffrey Michael Jacques, East Hartford, CT (US); John E. Paul, Portland, CT (US); Edwin Otero, Southington, CT (US); Alan W. Stoner, Tullahoma, TN (US)

(73) Assignee: United Technologies Corporation, Farmington, CT (US)

( * ) Notice: Subject to any disclaimer, the term of this patent is extended or adjusted under 35 U.S.C. 154(b) by 311 days.

(21) Appl. No.: 14/852,819

(22) Filed: Sep. 14, 2015

(65) Prior Publication Data

US 2016/0097294 A1  Apr. 7, 2016

Related U.S. Application Data

(60) Provisional application No. 62/058,516, filed on Oct. 1, 2014.

(51) Int. Cl.
*F01D 11/08* (2006.01)
*F01D 11/00* (2006.01)
(Continued)

(52) U.S. Cl.
CPC ............... *F01D 11/08* (2013.01); *F01D 5/02* (2013.01); *F01D 11/001* (2013.01);
(Continued)

(58) Field of Classification Search
CPC ...... F01D 11/08; F01D 11/001; F01D 11/025; F01D 5/02; F01D 25/28; F16J 15/3268;
(Continued)

(56) References Cited

U.S. PATENT DOCUMENTS 4,649,089 A * 3/1987 Thwaites ................ E06B 5/164
428/85
5,181,728 A * 1/1993 Stec ...................... F01D 11/001
277/355

(Continued)

OTHER PUBLICATIONS

Extended European Search Report dated Fevb. 26, 2016 in European Application No. 15187791.7.
(Continued)

*Primary Examiner* — Woody Lee, Jr.
*Assistant Examiner* — Adam W Brown
(74) *Attorney, Agent, or Firm* — Snell & Wilmer, L.L.P.

(57) ABSTRACT

A brush seal plate may comprise a flat ring with bristles protruding from an inner diameter of the flat ring. The brush seal plate may have a racetrack slot to allow the flat ring to move in a radial direction relative to a retention pin. The bristles may protrude from the inner diameter of the flat ring at an angle. A slot may be formed through the flat ring, and the slot may be angled. The flat ring may be circumferentially discontinuous. The flat ring may further comprise a retention opening configured to fix the flat ring in place relative to a retention pin.

17 Claims, 6 Drawing Sheets

(51) Int. Cl.
- *F01D 11/02* (2006.01)
- *F16J 15/3288* (2016.01)
- *F16J 15/44* (2006.01)
- *F01D 5/02* (2006.01)
- *F01D 25/28* (2006.01)
- *F16J 15/3268* (2016.01)

(52) U.S. Cl.
CPC ............ *F01D 11/025* (2013.01); *F01D 25/28* (2013.01); *F16J 15/3268* (2013.01); *F16J 15/3288* (2013.01); *F16J 15/442* (2013.01); *F05D 2220/32* (2013.01); *F05D 2240/56* (2013.01)

(58) Field of Classification Search
CPC .. F16J 15/442; F16J 15/3288; F05D 2220/32; F05D 2240/56
See application file for complete search history.

(56) References Cited

U.S. PATENT DOCUMENTS

| | | | | |
|---|---|---|---|---|
| 5,749,584 A * | 5/1998 | Skinner | ................... | F01D 9/023 277/355 |
| 5,799,952 A * | 9/1998 | Morrison | ............. | F16J 15/3288 277/355 |
| 6,027,121 A * | 2/2000 | Cromer | ................ | F16J 15/3288 277/347 |
| 6,139,018 A * | 10/2000 | Cromer | ................ | F16J 15/3288 277/301 |
| 6,168,162 B1 * | 1/2001 | Reluzco | ............... | F16J 15/3288 277/355 |
| 6,290,232 B1 * | 9/2001 | Reluzco | ................ | F01D 11/001 277/355 |
| 6,431,827 B1 * | 8/2002 | Wolfe | .................. | F01D 11/127 29/888.3 |
| 6,439,844 B1 * | 8/2002 | Turnquist | ............... | F01D 5/225 415/173.3 |
| 6,779,799 B2 * | 8/2004 | Tong | ...................... | F16J 15/061 277/355 |
| 6,880,829 B1 * | 4/2005 | Datta | ...................... | F01D 11/08 277/350 |
| 7,032,903 B1 * | 4/2006 | Dalton | .................. | F01D 11/001 277/355 |
| 7,703,774 B2 * | 4/2010 | Awtar | ................... | F01D 11/001 277/412 |
| 7,832,734 B2 * | 11/2010 | Beichl | ................... | F01D 11/001 277/355 |
| 8,002,285 B2 * | 8/2011 | Justak | ..................... | F01D 11/02 277/412 |
| 8,100,405 B2 * | 1/2012 | Kneeland | ................ | F01D 11/00 277/355 |
| 8,328,198 B2 * | 12/2012 | Adis | ..................... | F01D 11/003 277/355 |
| 9,234,592 B2 * | 1/2016 | Inoue | .................... | F01D 11/001 |
| 9,528,384 B2 * | 12/2016 | Zheng | .................. | F01D 11/001 |
| 2003/0201608 A1 * | 10/2003 | Addis | ................... | F01D 11/001 277/355 |
| 2005/0104300 A1 * | 5/2005 | Hogg | ................... | F01D 11/025 277/411 |
| 2007/0132190 A1 * | 6/2007 | Trabert | ................. | F01D 11/001 277/355 |
| 2008/0048398 A1 * | 2/2008 | Baird | .................... | F01D 11/003 277/355 |
| 2008/0217859 A1 * | 9/2008 | Addis | ................... | F01D 11/001 277/303 |
| 2008/0246223 A1 | 10/2008 | Justak | | |
| 2009/0315272 A1 * | 12/2009 | Kasahara | .............. | F01D 11/003 277/355 |
| 2011/0049810 A1 | 3/2011 | Ferryman et al. | | |
| 2013/0140777 A1 * | 6/2013 | Erb | ...................... | F16J 15/3288 277/578 |

OTHER PUBLICATIONS

EP Communication under Rule 71(3) EPC dated Nov. 6, 2017 in European Application No. 15187791.7.

* cited by examiner

BRUSH SEAL PLATE

CROSS-REFERENCE TO RELATED APPLICATIONS

This application is a nonprovisional of, and claims priority to, and the benefit of U.S. Provisional Application No. 62/058,516, entitled "BRUSH SEAL PLATE," filed on Oct. 1, 2014, which is hereby incorporated by reference in its entirety.

FIELD OF INVENTION

The present disclosure relates to brush seals, and, more specifically, to a brush seal plate for use in a gas turbine engine

BACKGROUND OF THE INVENTION

Gas turbine engines may include both rotating components and static components. In some sections of the engine, static components may be in close proximity to rotating components. Sealing may be desired to prevent air from moving between the rotating and static sections. The seals may be subject to vibration during operation. Furthermore, the seals may be subject to dynamically changing distances between the rotating and static components as the components expand or contract during operation. The vibration and expansion in the seals may reduce the efficacy of the seals and may cause air leakage. Leakage through the seals may lead to degraded fuel efficiency and reduced thrust in gas turbine engines.

SUMMARY OF THE INVENTION

In various embodiments, a brush seal plate may comprise a flat ring with bristles protruding from an inner diameter of the flat ring. The brush seal plate may have a racetrack slot to allow the flat ring to move in a radial direction relative to a retention pin. The bristles may protrude from the inner diameter of the flat ring at an angle. A split may be formed through the flat ring, and the split may be angled. The flat ring may be circumferentially discontinuous. The flat ring may further comprise a retention opening configured to fix the flat ring in place relative to a retention pin.

In various embodiments, a seal may include a brush seal plate with bristles extending radially inward from an inner diameter of the brush seal plate. The seal may further include a sealing disk axially proximate the brush seal plate with the bristles extending towards a seal shoe of the sealing disk. A retention opening may be formed in the brush seal plate. A spacer may have a retention pin that extends into the retention opening. The retention opening may comprise a racetrack slot configured to allow the brush seal plate to move radially relative to the retention pin. The retention opening may be configured to fix the brush seal plate in place relative to the retention pin. The brush seal plate may be circumferentially discontinuous. The bristles may extend radially inward from the brush seal plate at an angle.

In various embodiments, a gas turbine engine may include a rotating component and a static component next to the rotating component. A seal may be connected to the static component. The seal may include a brush seal plate with bristles extending radially inward from an inner diameter of the brush seal plate and a disk proximate the brush seal plate. The bristles may extend towards the disk. The brush seal plate may further comprise a retention opening in the brush seal plate. The brush seal plate may further comprise a spacer including a retention pin that extends into the retention opening. The retention opening comprises a racetrack slot configured to allow the brush seal plate to move radially relative to the retention pin. The brush seal plate may be circumferentially discontinuous. The bristles may also extend radially inward from the brush seal plate at an angle.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
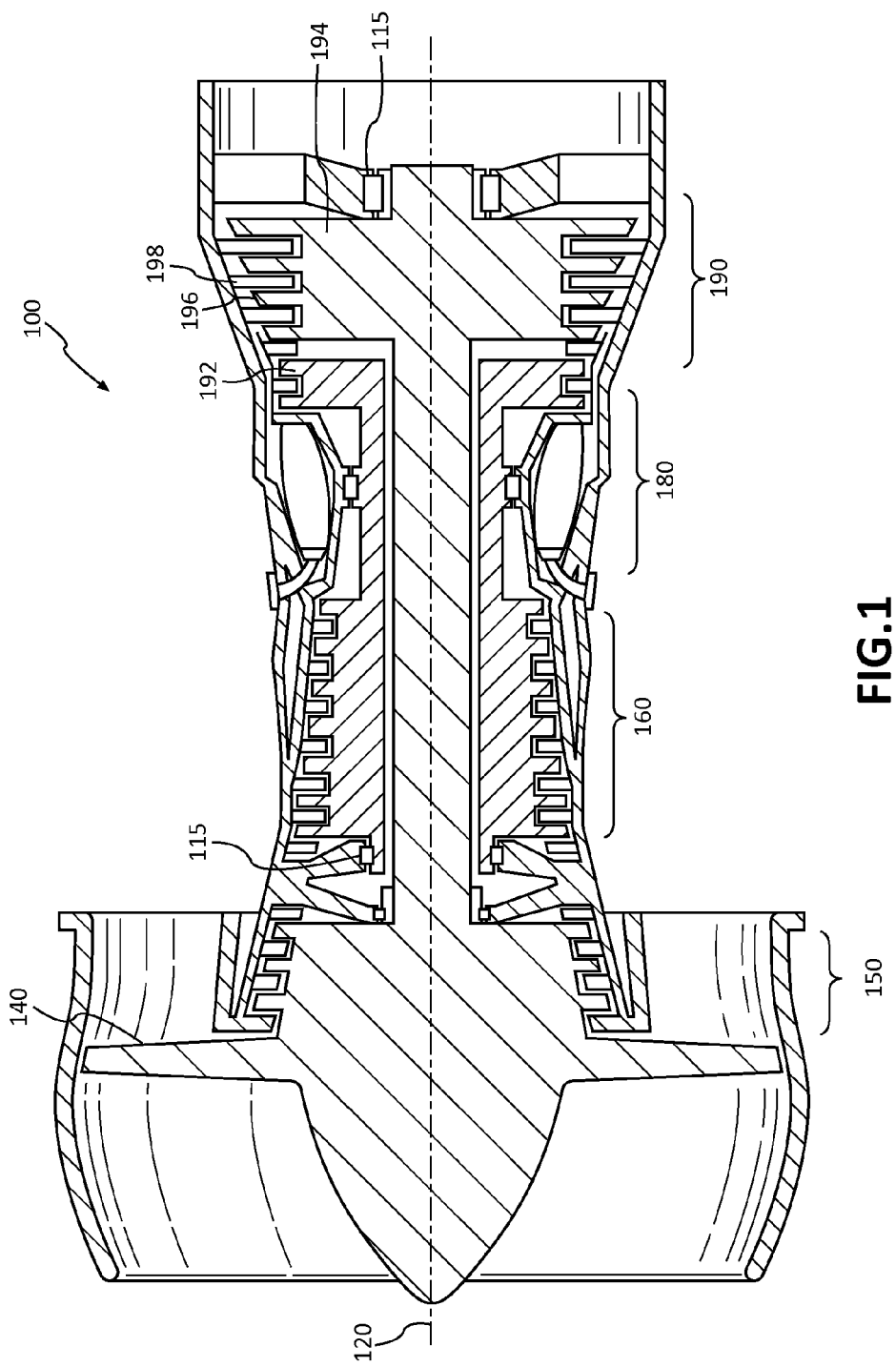
FIG. 1 illustrates a cross-sectional view of an exemplary gas turbine engine, in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and a turbine section 190. Air compressed in compressor sections 150, 160 may be mixed with fuel and burned in combustion section 180 and expanded across turbine section 190. Fan 140, compressor sections 150 and 160, and turbine section 190 may each contain rotating components that are adjacent to static components. Seals may be used to prevent air flow between rotating and static components.

Turbine section 190 may include high-pressure rotors 192 and low-pressure rotors 194, which rotate in response to the expansion. Turbine section 190 may comprise alternating rows of rotary airfoils or blades 196 and static airfoils or vanes 198. A plurality of bearings 115 may support spools in the gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
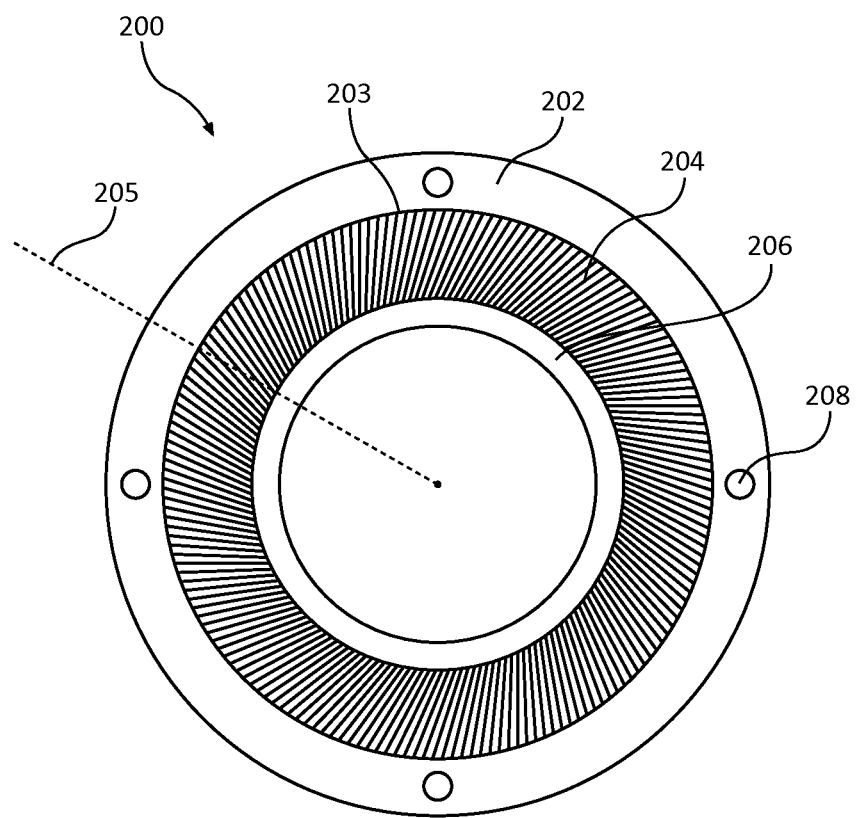
FIG. 2 illustrates an elevation view of a circular brush seal plate with bristles extending radially inward, in accordance with various embodiments.

FIG. 2 illustrates an elevation view of a circular brush seal plate with bristles extending radially inward, in accordance with various embodiments. Brush seal plate 200 includes a flat ring 202 with an inner diameter 203 defining a circular central opening having a center point. Flat ring 202 may be made from a high performance nickel-based superalloy (e.g., an alloy having a nominal composition of nickel 58%, chromium 19%, cobalt 13%, molybdenum 4%, titanium 3%, aluminum 1.4% that is available under the trade name WASPALOY). Bristles 204 may protrude radially inward from an inner diameter 203 of flat ring 202. Bristles may be made from strands of a high performance nickel-based superalloy.

In various embodiments, seal shoe 206 may be radially inward from flat ring 202. Seal shoe 206 may be an interfacing feature of a non-contacting aerodynamic film-riding seal (e.g., a seal available under the trademark HALO). Bristles 204 may extend from inner diameter 203 of flat ring 202 towards the outer diameter of a seal shoe 206 and contact seal shoe 206. Bristles 204 contacting seal shoe 206 may vary in length. The spring rate of brush seal plate 200 may be low to minimize the impact bristles 204 in contact with seal shoe 206 may have on the motion response of seal shoe 206. At the same time, the spring rate of brush seal plate 200 may be selected to provide damping of seal shoe 206.

In various embodiments, the contact force between bristles 204 and seal shoe 206 should be high enough to dampen vibration of seal shoe 206. The brush seal plate 200 design may be based on a desired pressure range of the seal system, with stiffer bristles being used as the seal is used in higher pressure applications. A bristle 204 may extend radially inward at an angle relative to a radial line 205 passing through the bristle 204. Flat ring 202 may have one or more retention openings 208 to receive a retention pin fixing brush seal plate 200 in place and preventing circumferential rotation with respect to the retention pin.

Figure 3:
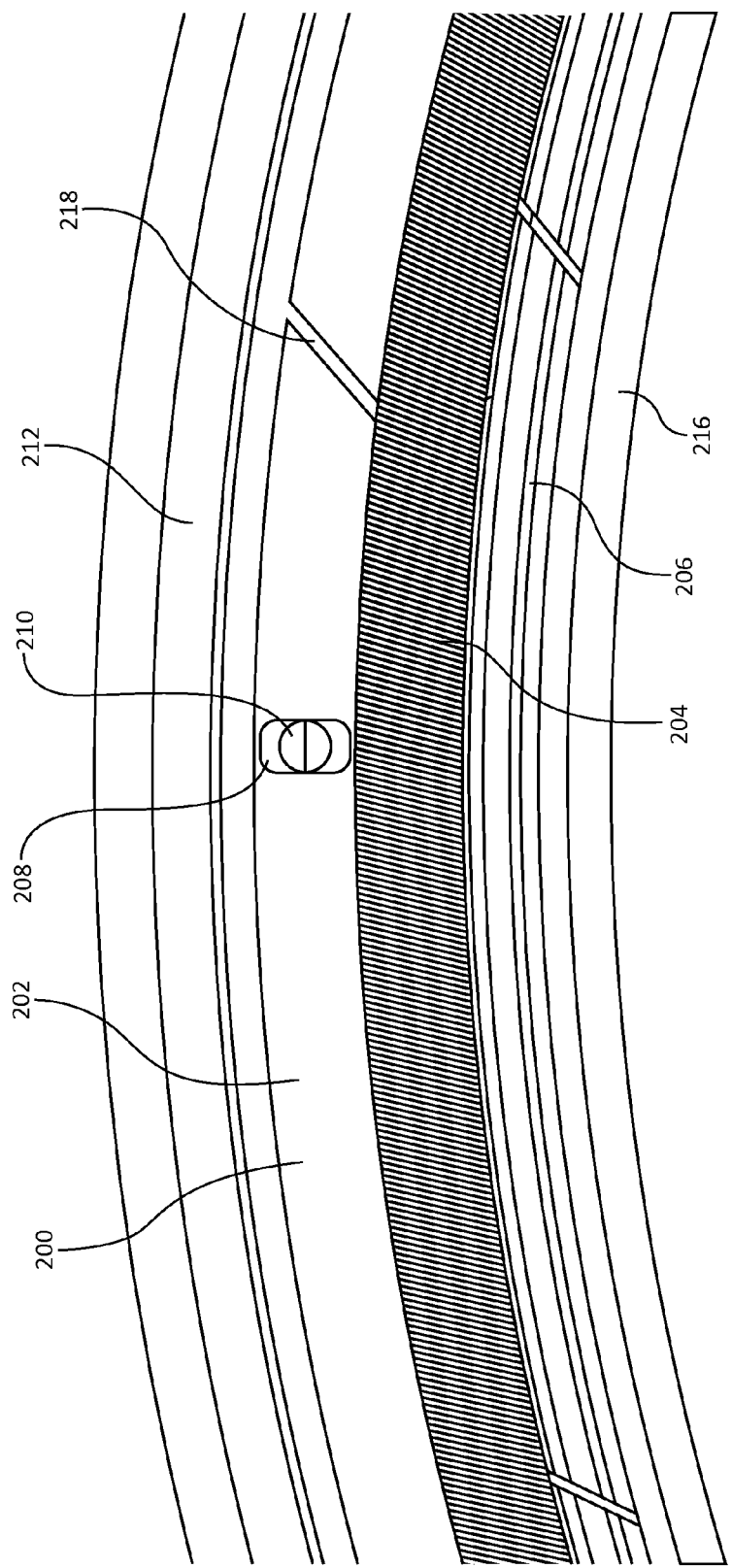
FIG. 3 illustrates a seal including a brush seal plate with bristles extending radially inward towards a seal shoe, in accordance with various embodiments.

FIG. 3 illustrates a partial cross section of a seal including brush seal plate 200 with bristles 204 extending radially inward towards a seal shoe 206, in accordance with various embodiments. Flat ring 202 includes retention opening 208. Retention opening 208 may be a racetrack slot to permit flat ring 202 to move radially inward and radially outward relative to retention pin 210 as flat ring 202 expands or contracts. Retention opening 208 may also match the shape of retention pin 210 to prevent radial movement of flat ring 202 relative to retention pin 210. Retention opening 208 may be configured to prevent brush seal plate 200 from moving circumferentially.

In various embodiments, spacer 212 may be positioned adjacent to a low pressure side of flat ring 202. Spacer 212 may fix retention pin 210 in place with flat ring 202 held from rotating relative to spacer 212 by retention pin 210. Bristles 204 may extend radially inward and at an angle from flat ring 202 towards an outer diameter of seal shoe 206. Bristles 204 tend to limit air flow between an inner diameter of flat ring 202 and an outer diameter of seal shoe 206. Rotating component 216 is radially inward from seal shoe 206 with an inner diameter of seal shoe 206 limiting air flow between rotating component 216 and seal shoe 206.

In various embodiments, brush seal plate 200 may include one or more split 218 defined by radial edges of flat ring 202. Split 218 may completely separate adjacent portions of flat ring 202 so that flat ring 202 is circumferentially discontinuous. Split 218 may also partially separate adjacent portions of flat ring 202. Split 218 may relieve stress in flat ring 202 during expansion and contraction. Split 218 in brush seal plate 200 may be angled relative to a radial direction so that as split 218 expands or contracts there is still overlap between edges of flat ring 202 defining split 218. Split 218 may also be non-linear, radial, or any shape that permits expansion and contraction of flat ring 202.

Figure 4:
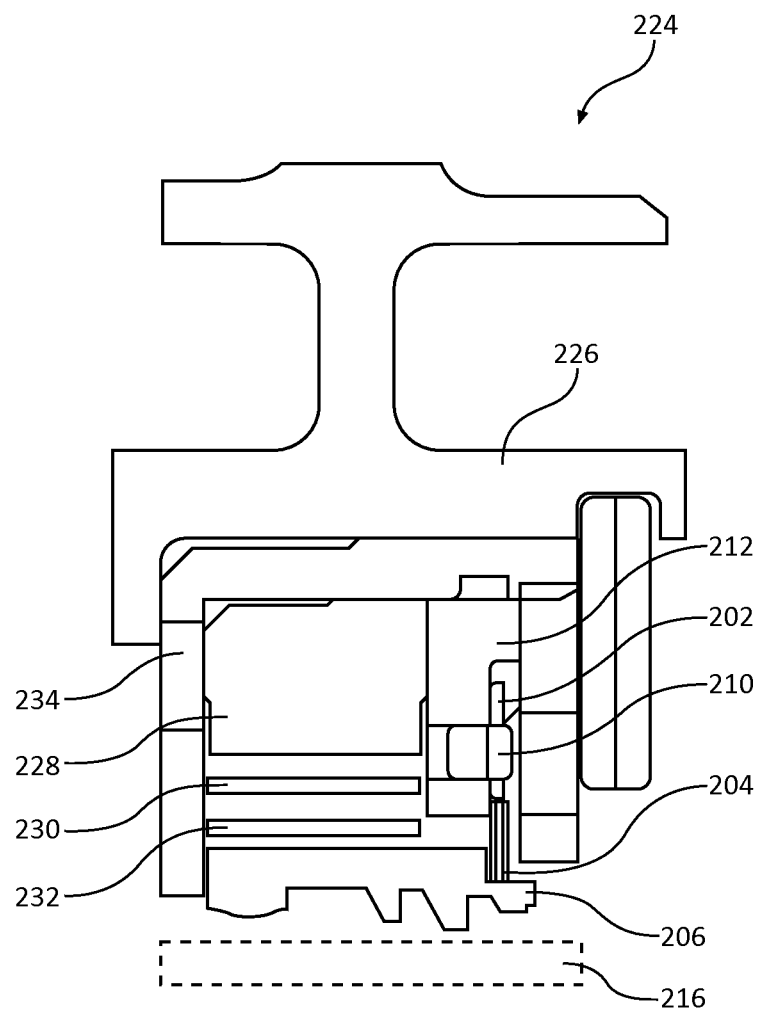
FIG. 4 illustrates a cross-sectional view of a seal with a brush seal plate, in accordance with various embodiments.

FIG. 4 illustrates a partial cross section of a seal 224 incorporating seal shoe 206 as a primary seal and brush seal plate 200 as a secondary seal, in accordance with various embodiments. Seal 224 includes static seal support architecture 226 at a distal end of seal 224. Static seal support architecture 226 holds seal 224 in place and interfaces with secondary static seal support architecture 234. A high-pressure side of seal 224 includes spacer 212 radially inward from secondary static seal support architecture 234. Spacer 212 fixes retention pin 210 in place and retention pin 210 interfaces with retention opening 208 of flat ring 202. Bristles 204 extending radially inward from flat ring 202 may contact an outer diameter of seal shoe 206. Bristles 204 may flex as seal shoe 206 moves radially outward as a result of vibration or expansion to maintain effective sealing properties while providing flexibility.

In various embodiments, seal shoe 206, outer beam 230, and inner beam 232 comprise a sealing disk 228. Secondary static seal support architecture 234 scallops to allow air to pass through sealing disk 228. Air may pass between outer beam 230 and inner beam 232, and between inner beam 232 and seal shoe 206. Seal shoe 206 may be adjacent to rotating component 216 with a corrugated surface of seal shoe 206 limiting air flow between rotating component 216 and seal shoe 206. As rotating component 216 expands, seal shoe 206 may move radially outward with the pressure of air flowing over the corrugated surface maintaining a small space between rotating component 216 and seal shoe 206.

Figure 5:
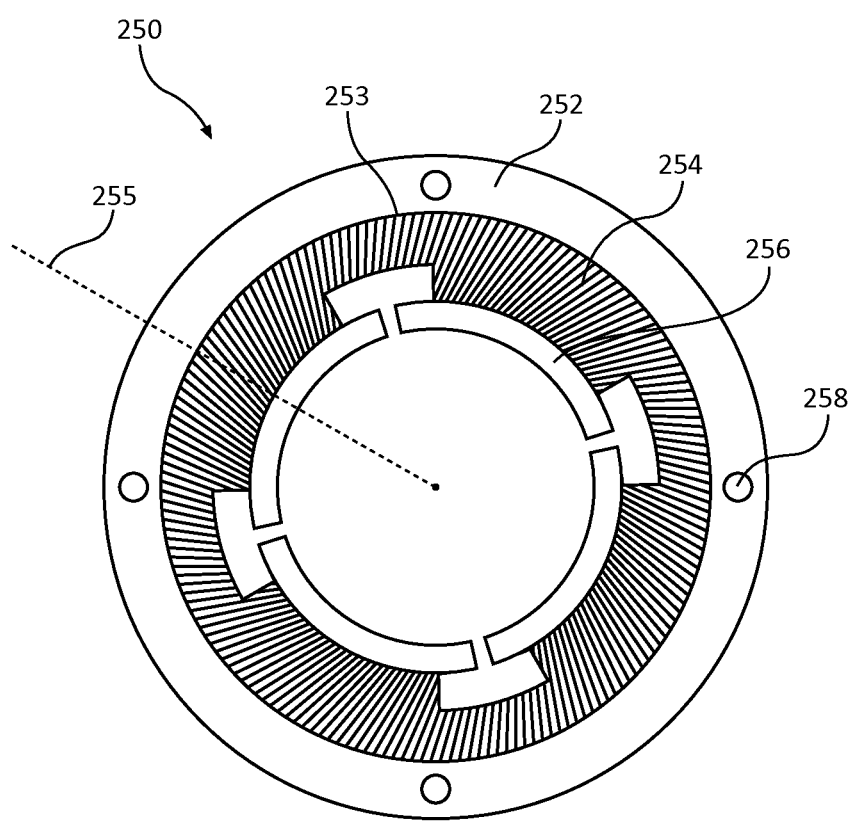
FIG. 5 illustrates an elevation view of a circular brush seal plate with bristles extending radially inward to a local arc of a seal shoe, in accordance with various embodiments.

FIG. 5 illustrates an elevation view of a brush seal plate 250 with bristles 254 extending radially inward towards an arc of seal shoe 256, in accordance with various embodiments. Brush seal plate 250 includes a flat ring 252 with an inner diameter 253 defining a circular central opening having a center point. Flat ring 252 may be made from a high performance nickel-based superalloy (e.g., an alloy having a nominal composition of nickel 58%, chromium 19%, cobalt 13%, molybdenum 4%, titanium 3%, aluminum 1.4% that is available under the trade name WASPALOY). Bristles 254 may protrude radially inward from an inner diameter 253 of flat ring 252. Bristles may be made from strands of a high performance nickel-based superalloy.

In various embodiments, seal shoe 256 may be radially inward from flat ring 252. Bristles 254 may extend from inner diameter 253 of flat ring 252 towards the outer diameter of an arc of seal shoe 256 and contact the arc of seal shoe 256. Bristles 254 contacting an arc of seal shoe 256 may be longer than bristles 254 in between local arcs of seal shoe 256. In that regard, bristles 254 may vary in length. The spring rate of brush seal plate 250 may be low to minimize pressure applied by bristles 254 in contact with seal shoe 256. In that regard, the spring rate of brush seal plate 250 may be selected to minimize the impact of bristles 254 on the motion response of seal shoe 256. The contact force between bristles 254 and seal shoe 256 may also be high enough to damp vibration in seal shoe 256.

In various embodiments, interaction between bristles 254 and seal shoe 256 may be intermittent around the circumference of brush seal plate 250 to implement shoe damping. The brush seal plate 250 design may be based on a desired pressure range of the seal system. A bristle 254 may extend radially inward at an angle relative to a radial line 255 passing through the bristle 254. Flat ring 252 may have one or more retention openings 258 to receive a retention pin fixing brush seal plate 250 in place and preventing circumferential rotation with respect to the retention pin.

Figure 6:
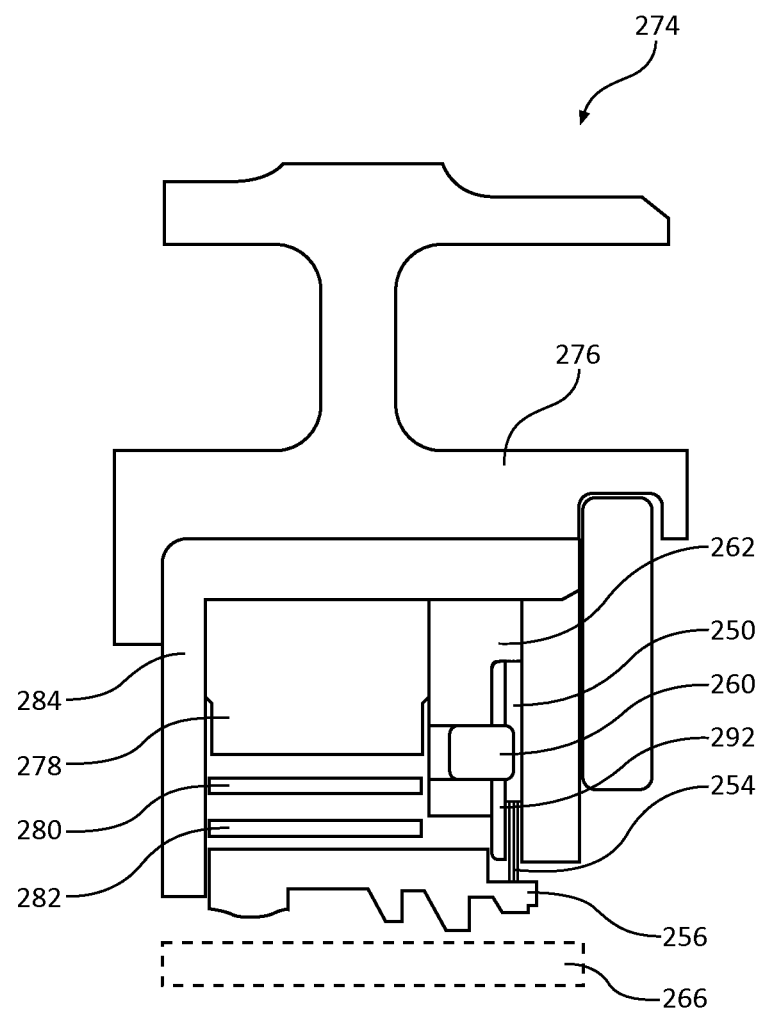
FIG. 6 illustrates a cross-sectional view of a seal incorporating a brush seal plate with bristles extending radially inward towards a seal shoe, in accordance with various embodiments.

In various embodiments, and with reference to FIG. 6, a partial cross section of a seal 274 including a flat seal plate 292 and brush seal plate 250 is shown. Seal 274 may include static seal support architecture 276 at a distal end of seal 274. Static seal support architecture 276 holds seal 274 in place and interfaces with secondary static seal support architecture 284. A high-pressure side of seal 274 includes spacer 262 radially inward from secondary static seal support architecture 284. Spacer 262 may be positioned adjacent to a low pressure side of flat seal plate 292. Spacer 262 may fix retention pin 260 in place with bristles 254 held from rotating relative to spacer 262 by retention pin 260. Bristles 254 may extend radially inward and at an angle towards seal shoe 256.

In various embodiments, seal shoe 256, outer beam 280, and inner beam 282 comprise a sealing disk 278. Secondary static seal support architecture 284 scallops to allow air to pass through sealing disk 278. Air may pass between outer beam 280 and inner beam 282 and between inner beam 282 and seal shoe 256. Seal shoe 256 is adjacent to rotating component 266 with a corrugated surface of seal shoe 256 limiting air flow between rotating component 266 and seal shoe 256. As rotating component 266 expands, seal shoe 256 may move radially outward with the pressure of air flowing over the corrugated surface maintaining a small space between rotating component 266 and seal shoe 256.

In various embodiments, seal 274 may include a flat seal plate 292 extending radially inward from retention pin 260 towards seal shoe 256. Flat seal plate 292 may contact a radial wall of seal shoe 256. Brush seal plate 250 may be added on a high-pressure side of flat seal plate 292 and may contact seal shoe 256. In response to the contact, bristles 254 of brush seal plate 250 may flex as seal shoe 256 moves radially outward. In various embodiments, brush seal plate 250 may provide damping for seal shoe 256 and flat seal plate 292 may provide sealing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brush seal plate system, comprising:
   a flat ring comprising an inner diameter defining a central opening;
   a bristle protruding from the inner diameter of the flat ring into the central opening;
   a retention opening in the flat ring, radially outward of the bristles, that comprises a racetrack slot; and
   a retention pin in the retention opening that extends axially entirely through the flat ring, where the radial movement of the flat ring relative to the pin is constrained radially inward and radially outward by the retention pin and the shape of the racetrack.

2. The brush seal plate system of claim 1, wherein the bristle protrudes radially inward from the inner diameter at an angle relative to a radial line passing through the bristle.

3. The brush seal plate system of claim 1, further comprising a split formed through the flat ring.

4. The brush seal plate system of claim 3, wherein the split is angled relative to a radial line passing through the split.

5. The brush seal plate system of claim 1, wherein the flat ring is circumferentially discontinuous.

6. The brush seal plate system of claim 1, wherein the flat ring further comprises a retention opening configured to fix the flat ring in place circumferentially relative to the retention pin.

7. A seal comprising:
   a brush seal plate;
   a bristle extending radially inward from an inner diameter of the brush seal plate;
   a retention opening in the brush seal plate, radially outward of the bristles, that comprises a racetrack slot;
   a retention pin in the retention opening that extends axially entirely through the brush seal plate, where the radial movement of the brush seal plate relative to the pin is constrained radially inward and radially outward by the retention pin and the shape of the racetrack; and
   a sealing disk axially proximate the brush seal plate, wherein the bristle extends towards a seal shoe of the sealing disk.

8. The seal of claim 7, further comprising:
   a spacer adjacent the brush seal plate.

9. The seal of claim 8, wherein the retention opening is configured to fix the brush seal plate in place circumferentially, relative to the retention pin.

10. The seal of claim 7, wherein the bristle contacts the seal shoe of the sealing disk.

11. The seal of claim 7, wherein the brush seal plate is circumferentially discontinuous.

12. The seal of claim 7, wherein the bristle extends radially inward from the brush seal plate at an angle relative to a radial line passing through the bristle.

13. A gas turbine engine, comprising:
   a rotating component;
   a static seal support architecture proximate the rotating component in a radial direction; and
   a seal connected to the static seal support architecture comprising,
      a brush seal plate,
      a bristle extending radially inward from an inner diameter of the brush seal plate,
      a retention opening in the brush seal plate, radially outward of the bristles, comprising a racetrack slot;
      a retention pin in the retention opening that extends axially entirely through the brush seal plate, where the radial movement of the brush seal plate relative to the pin is constrained radially inward and radially outward by the retention pin and the shape of the racetrack; and
      a disk proximate the brush seal plate, wherein the bristle extends towards the disk.

14. The gas turbine engine of claim 13, wherein the brush seal plate further comprises a spacer.

15. The gas turbine engine of claim 14, wherein the retention opening is configured to fix the brush seal plate in place circumferentially, relative to the retention pin.

16. The gas turbine engine of claim 13, wherein the brush seal plate is circumferentially discontinuous.

17. The gas turbine engine of claim 13, wherein the bristle extends radially inward from the brush seal plate at an angle relative to a radial line passing through the bristle.

* * * * *